(12) United States Patent
Bobba

(10) Patent No.: US 9,308,881 B2
(45) Date of Patent: Apr. 12, 2016

(54) HYBRID QUARTER MODULE DESIGN FOR FRONT UNDERRUN PROTECTION DEVICE

(71) Applicant: SABIC Global Technologies BV, Bergen op Zoom (NL)

(72) Inventor: Somasekhar Bobba, Bangalore (IN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 14/762,951

(22) PCT Filed: Feb. 5, 2014

(86) PCT No.: PCT/IB2014/058819
§ 371 (c)(1),
(2) Date: Jul. 23, 2015

(87) PCT Pub. No.: WO2014/125400
PCT Pub. Date: Aug. 21, 2014

(65) Prior Publication Data
US 2015/0367798 A1 Dec. 24, 2015

(51) Int. Cl.
*B60R 19/00* (2006.01)
*B60R 19/56* (2006.01)
*B60R 19/18* (2006.01)

(52) U.S. Cl.
CPC .......... *B60R 19/56* (2013.01); *B60R 2019/1833* (2013.01); *B60R 2019/1846* (2013.01)

(58) Field of Classification Search
CPC ............ B60R 19/56; B60R 2019/1846; B60R 2019/1866
USPC ............. 296/187.09; 293/132, 133, 102, 120, 293/155; 188/371
See application file for complete search history.

(56) References Cited

U.S. PATENT DOCUMENTS

| 3,744,835 A | 7/1973 | Carbone et al. |
| 6,270,131 B1 * | 8/2001 | Martinez ................. B60R 19/34 188/371 |

(Continued)

FOREIGN PATENT DOCUMENTS

WO 2013002010 A1 1/2013

OTHER PUBLICATIONS

International Search Report; International Application No. PCT/IB2014/058819; International Filing Date: Feb. 5, 2014; Date of Mailing: May 19, 2014; 13 pages.

(Continued)

*Primary Examiner* — Joseph D Pape
(74) *Attorney, Agent, or Firm* — Cantor Colburn LLP

(57) ABSTRACT

In an embodiment, a component for an underrun protection device can comprise: a housing member (10), comprising a main body (100) having a base plate (108) with a top wall (103), bottom wall (109), and optional side walls (104), extending from one side of the base plate (108) to form a housing (115); an arm (101) extending from another side of the base plate (108), wherein the arm (101) comprises a base (109) in contact with the base plate (108), arm sides (105) that extend from the base (109) toward a connection area (107), wherein the arm sides (105) form an arm channel (113); a body polymeric insert (200) comprising body insert ribs (202) and body insert channels (204); and an arm polymeric insert (300) comprising arm insert ribs (302) and arm insert channels (304), wherein the arm polymeric insert (300) is located in the arm channel (113).

19 Claims, 13 Drawing Sheets

(56) References Cited

U.S. PATENT DOCUMENTS

| | | | |
|---|---|---|---|
| 6,652,010 B1 | 11/2003 | Huddle et al. | |
| 2011/0101714 A1* | 5/2011 | Bator | B60R 19/18 293/132 |
| 2012/0112479 A1 | 5/2012 | Nagwanshi et al. | |

OTHER PUBLICATIONS

Written Opinion of the International Searching Authority; International Application Na PCT/IB2014/058819; International Filing Date: Feb. 5, 2014; Date of Mailing: May 19, 2014; 4 pages.

* cited by examiner

US 9,308,881 B2

HYBRID QUARTER MODULE DESIGN FOR FRONT UNDERRUN PROTECTION DEVICE

CROSS REFERENCE TO RELATED APPLICATIONS

This application is a 371 of International Application No. PCT/IB2014/058819, filed Feb. 5, 2014, which claims priority to Indian Application No. 452/DEL/2013, filed Feb. 18, 2013, which are incorporated herein by reference in their entirety.

TECHNICAL FIELD

The present disclosure relates generally to front underrun protection for use in a vehicle, e.g., a truck, to prevent a lower vehicle, e.g., a car, from being pushed under the truck in the event of a collision. Particularly, the present disclosure relates to a metal-polymeric hybrid underrun protection device.

BACKGROUND

Underrun protection devices are designed to prevent a smaller vehicle from wedging under a larger vehicle in a collision. For example, in the event of a front collision between a car and a heavy truck that does not have underrun protection, the front part of the car (e.g., the hood and engine compartment), and possibly even the windshield and steering column, are forced under the truck due to the height difference (from the ground to the bumper) of the truck. Thus, front underrun protection devices were developed in an effort to inhibit shorter vehicles from traveling under taller vehicles in a head-on collision.

Regulations govern the impact performance for front underrun protection devices. For example, ECE-R93 requires that front underrun devices meet certain performance criteria. In particular, ECE-R93 involves an analysis of a quasi-static load applied longitudinally of 60,000 Newtons (N) (50% of vehicle weight/maximum of 80 kiloNewtons (kN) for vehicles greater than 16 ton) a corner (P1) and center (P3) areas and 120,000 N (100% of vehicle weight/maximum of 160 kN for vehicles greater than 16 ton) at the support area (P2) (see FIG. 1). The maximum allowable deformation is 400 millimeters (mm).

Typically, front underrun protection devices are made from steel and fitted onto the front of a tall vehicle (e.g., a vehicle where the distance from the bottom of the bumper to the ground is greater than 400 mm). However, this device is heavy and labor intensive. For example, a steel device typically requires complex manufacturing including multiple weldings. In addition, steel devices are typically comprised of multiple components requiring complicated assembly.

Therefore, there is a need to provide a light-weight, easily assembled, and easily manufactured front underrun protection device that will meet the established safety regulations.

SUMMARY

Disclosed, in various embodiments, are low-weight front underrun protection device components that can be easily shipped and assembled.

In an embodiment, a component for an underrun protection device can comprise: a housing member (10), comprising a main body (100) having a base plate (108) with a top wall (103), bottom wall (109), and optional side walls (104), extending from one side of the base plate (108) to form a housing (115); an arm (101) extending from another side of the base plate (108), wherein the arm (101) comprises a base (109) in contact with the base plate (108), arm sides (105) that extend from the base (109) toward a connection area (107), wherein the arm sides (105) form an arm channel (113); a body polymeric insert (200) comprising body insert ribs (202) and body insert channels (204), wherein the body polymeric insert (200) is located in the housing (115); and an arm polymeric insert (300) comprising arm insert ribs (302) and arm insert channels (304), wherein the arm polymeric insert (300) is located in the arm channel (113).

In one embodiment, a vehicle can comprise a rail, an underrun protection device, and a bumper beam.

The foregoing and other features will be more readily apparent from the following detailed description and drawings of the illustrative embodiments.

BRIEF DESCRIPTION OF THE DRAWINGS

The features of the front underrun protection device described will become apparent from the following detailed description when read in conjunction with the drawings, which are exemplary, not limiting, and wherein like elements are numbered alike in several figures.

DETAILED DESCRIPTION

The current trend is to use a steel system, but a steel system is very heavy and requires complex manufacturing and assembly. However, it has been determined that a pure polymeric member will not meet all of the standards for front underrun protection devices (e.g., ECE-R93). Disclosed herein are light-weight (compared to steel systems) hybrid front underrun protection systems. As used herein, hybrid refers to a multi-material system (e.g., formed from two or more materials). These systems can be a single unit or can be formed from several components, which can be used in combination to form the underrun protection device and meet established safety requirements. The presently disclosed components can be manufactured, shipped, and then assembled into a front underrun protection device, enabling more compact, facile shipping. Optionally, the modules can be interchangeable quarter modules, wherein each quarter module can function as the left or right side of a half module. Alternatively, quarter modules can be distinct so as to form either the left or right half of a half module. The disclosed front underrun protection device components offer advantages in simplifying the manufacturing and assembly processes, as well as lowering the overall weight of the assembled front underrun protection device, while exceeding established safety requirements.

Figure 1:
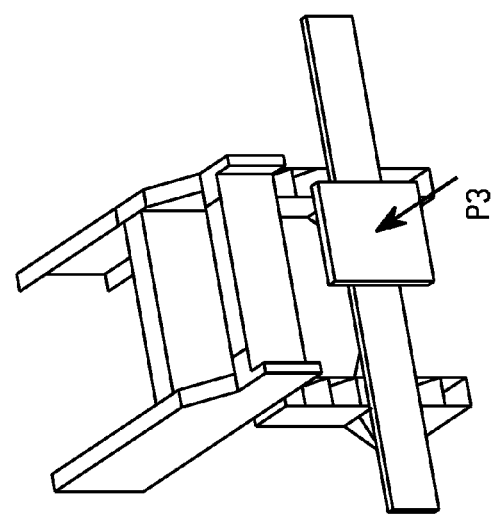
FIG. 1 is an illustration of impact locations for testing standards.
Figure 1:
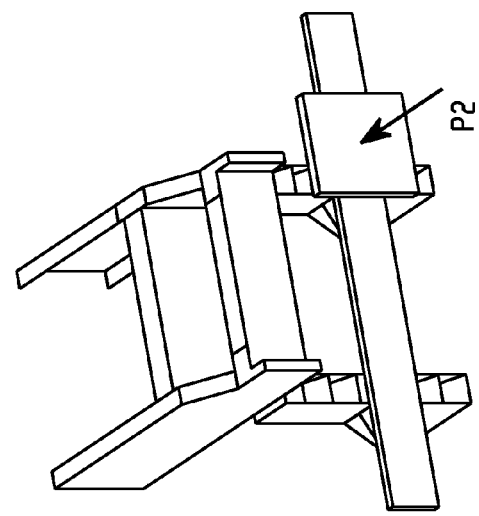
Figure 1:
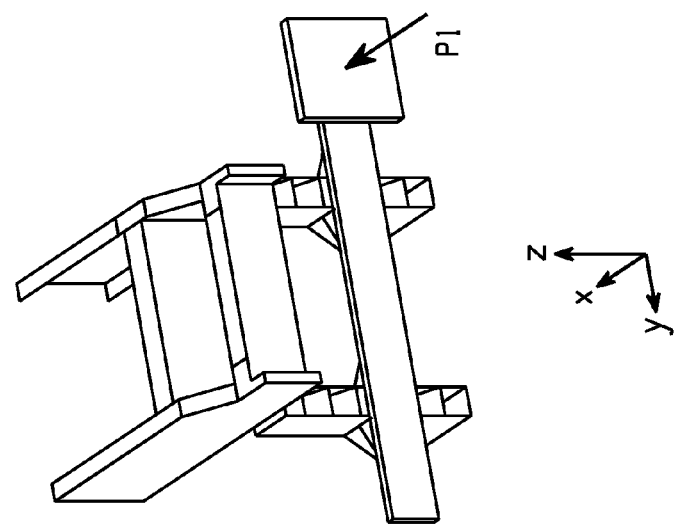

Table 1, below, presents several established safety standards. The loads are applied longitudinally using a ram. The locations for the load applications are illustrated in FIG. 1.

TABLE 1

| Test Load (kN) | USA FMVSS 223/224 Rear | ECE R93:-FRONT* | E.C.E R58: Rear barrier** | E.C.E R73 Side |
|---|---|---|---|---|
| outer edge (P1) | 50 kN | 80 kN | 25 kN | 1 kN |
| center (P3) | 50 kN | 80 kN | 25 kN | |
| off center (P2) | 100 kN | 160 kN | 100 kN | |
| Allowed deflection | 125 mm | 400 mm | | 30 mm in front of wheels, (300) mm elsewhere |
| Height | 560 mm | 400 mm | 500 mm | 500 kN |

*These test loads apply to vehicles with a GVM greater than 16 ton for other vehicles lower values are permitted and are a function of vehicle GVM.
**These test loads apply to vehicles with a GVM >20 ton for other vehicles lower values are permitted and are a function of vehicle GVM.

The present underrun protection device can meet or even exceed each of the standards listed in Table 1. Furthermore, the current device can meet or exceed the standards at a significant weight reduction compared to a steel underrun protection device that also meets the same standard for the same vehicle. The weight reduction can be greater than or equal to 20% and even greater than or equal to 30%.

In particular, the components are designed to be assembled together to form an underrun protection device. The components are also designed to be used in combination with a metal bar to form a front underrun protection device. In an embodiment, the components are manufactured as a single underrun protection device, e.g. inseparably connected to one another (i.e., cannot be separated without damage to the housing member. In another embodiment, the components are manufactured as portions of the device, e.g., an eighth, sixth, quarter, or half of the underrun protection device.

The components can comprise a housing member, e.g., a shell, and one or more polymeric inserts that are inserted into area(s) within the housing member. The housing member provides structural integrity to the system and enables the system to pass the more stringent test standards such as ECE-R93. The housing member can comprise a material such as metal, polymers, and the like, such as reinforced thermoplastic materials, reinforced thermoset materials, can combinations comprising at least one of the foregoing. Reinforcement can include fibers, (continuous, chopped, woven, and the like), formed of carbon, glass, plastic, metal, as well as combinations comprising at least one of the foregoing. For example the housing member can be metallic, e.g., formed from a metal or metal alloy. In another example, the housing member can comprise carbon fiber reinforced polymers. In another example, the housing member can comprise glass fiber reinforced polymers. The housing member has a different composition than at least one of the inserts in the housing member.

The polymeric inserts, which can be manufactured utilizing various molding processes (e.g., injection molding, thermoforming, extrusion, etc.), are ribbed to provide a desired stiffness while effectively reducing the overall weight of the component. The polymeric inserts can have a ribbed structure (e.g., ribs and channels), such as a honeycomb structure, e.g., an array of walls and channels. The combs of the structure can be a shape having greater than or equal to 5 sides, such as pentagonal, hexagonal, heptagonal, and octagonal, and so forth, geometries, as well as combinations comprising at least one of the foregoing geometries, and specifically a hexagonal geometry. Optionally the structure (e.g., honeycomb with hexagonal geometry), has walls that extend the length of the structure, but that do not extend across (e.g., block) the channel formed therein (e.g., the channel can be open at both ends). Optionally, rib(s) can be disposed within individual combs. Polymeric honeycombs can be made by bonding extruded plastic tubes together, injection molding the plastic honeycombs, extruding the honeycomb structure, or otherwise formed. For example, the element can be a co-extruded component having combs of the same or different material, e.g., adjacent combs can comprise a different material composition. Optionally, some or all of the combs have foam therein. In other words, the combs can, individually, be hollow or filled, such that the structural integrity can be modified by filling particular combs, by using different plastic for particular combs, or a combination comprising at least one of the foregoing. One possible fill material is foam.

The overall size of the polymeric insert will be dependent upon its location within the underrun protection device and the size of the associated opening in the housing member. Furthermore, the characteristics of the reinforcement will depend upon the energy absorption characteristics desired in the particular area, e.g., the number of combs per unit area, the thickness of the comb walls, and the specific material of the plastic reinforcement. The density of combs (number of combs per unit area) is dependent upon the desired stiffness, crush characteristics, and materials employed. In some embodiments, the density can be 1 to 20 combs per 100 mm$^2$, specifically, 1 to 10 combs per 100 mm$^2$, and more specifically 1 to 5 combs per 100 mm$^2$. The diameter of the combs can be greater than or equal to 12 mm, specifically greater than or equal to 15 mm, depending upon the desired crush characteristics. In various embodiments, the thickness of the walls of the plastic reinforcement can be 0.5 mm to 10 mm, specifically, 2 mm to 5 mm, and more specifically 2 mm to 4 mm. Generally, a reinforcement will comprise greater than or equal to 10 combs, specifically, greater than or equal to 20 combs, and more specifically, greater than or equal to 30 combs.

In some embodiments, the plastic reinforcement can be co-molded with the metal component and located in the cavity. This can be achieved by standard insert molding process.

The inserts can be retained with a friction fit. In other words, the inserts are friction fit into the channel without mechanical or chemical attachments (e.g., glue, adhesive, mechanical means, and so forth). In addition, the inserts can be overmold structures. In an embodiment, the polymeric material is overmolded over the housing member. The housing member can comprise grooves with openings into the grooves such that the polymer of the inserts, can pass through the opening and spread within the groove, thereby locking the housing member and insert together. Optionally, the insert can be co-molded with the housing member and located in the cavity. This can be achieved by standard insert molding process.

In addition, certain attachments may be employed to retain the polymeric inserts. The attachments can be mechanical and/or chemical. Examples of mechanical attachments include locking element(s) (such as polymer (e.g., polymer extruded through an opening in the wall connecting the polymeric insert to the outside surface of the housing member)), snaps, hooks, screws, bolts, rivets, welds, crimp(s) (e.g., the crimped metal wall), metal protrusions from the housing member wall to and/or into the polymeric insert (such as tabs or the like extending from the wall(s) into the channel to engage the polymeric insert), and the like. Examples of chemical attachments include bonding agents, glue, adhesive, and so forth The polymeric inserts can comprise any polymeric material or combination of polymeric materials that can be formed into the desired shape and provide the desired properties. Exemplary materials include polymeric materials as well as combinations of polymeric materials with elastomeric materials, and/or thermoset materials. In one embodiment, the polymeric materials comprise thermoplastic materials. Possible polymeric materials include polybutylene terephthalate (PBT); acrylonitrile-butadiene-styrene (ABS); polycarbonate (LEXAN™ and LEXAN™ EXL resins, commercially available from SABIC's Innovative Plastics business); polyethylene terephthalate (PET); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC's Innovative Plastics business); blends of polycarbonate/PET/PBT; PBT and impact modifier (XENOY™ resins, commercially available from SABIC's Innovative Plastics business); polyamides; phenylene sulfide resins; polyvinyl chloride PVC; high impact polystyrene (HIPS); low/high density polyethylene (L/HDPE); polypropylene (PP); expanded polypropylene (EPP); polyethylene and fiber composites; polypropylene and fiber composites (AZDEL Superlite™ sheets, commercially available from Azdel, Inc.); long fiber reinforced thermoplastics (VERTON™ resins, commercially available from SABIC's Innovative Plastics business) and thermoplastic olefins (TPO), as well as combinations comprising at least one of the foregoing. An exemplary filled resin is STAMAX™ resin, which is a long glass fiber filled polypropylene resin also commercially available from SABIC's Innovative Plastics business. Some possible reinforcing materials include fibers, such as glass, carbon, and so forth, as well as combinations comprising at least one of the foregoing; e.g., fiber reinforced resins such as long glass fibers and/or long carbon fiber reinforced resins. The polymeric inserts can also be formed from combinations comprising at least one of any of the above-described materials.

Optionally, all of the inserts can be formed of the same material. Alternatively, different materials can be used for different inserts. It is contemplated that any combination of materials can be used to, e.g., enhance crush characteristics, reduce damageability, etc.

The polymeric inserts can be manufactured utilizing various molding processes (e.g., injection molding, thermoforming, extrusion, etc.) to provide a single piece assembly (e.g., an integrally formed energy absorber).

The polymeric inserts can be removably installed into the housing member from the rear of the housing member, pressing the inserts into the corresponding channels. The inserts have a shape complementary to the shape of the channels.

The housing member can be formed via various methods, depending upon the material of the housing member such as rolling, forging, bending, hydroforming, casting, molding (e.g, injection molding), and so forth, or a combination process comprising at least one of the foregoing.

The overall size, e.g., the specific dimensions of the components described herein will depend upon their location in the vehicle (front, rear, and/or side), as well as the particular vehicle for which it is intended (e.g., size, weight, height from the ground). For example, the length (l), height (h), and width (w) of the components will depend upon the amount of space available in the desired location, and the necessary impact performance.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 2:
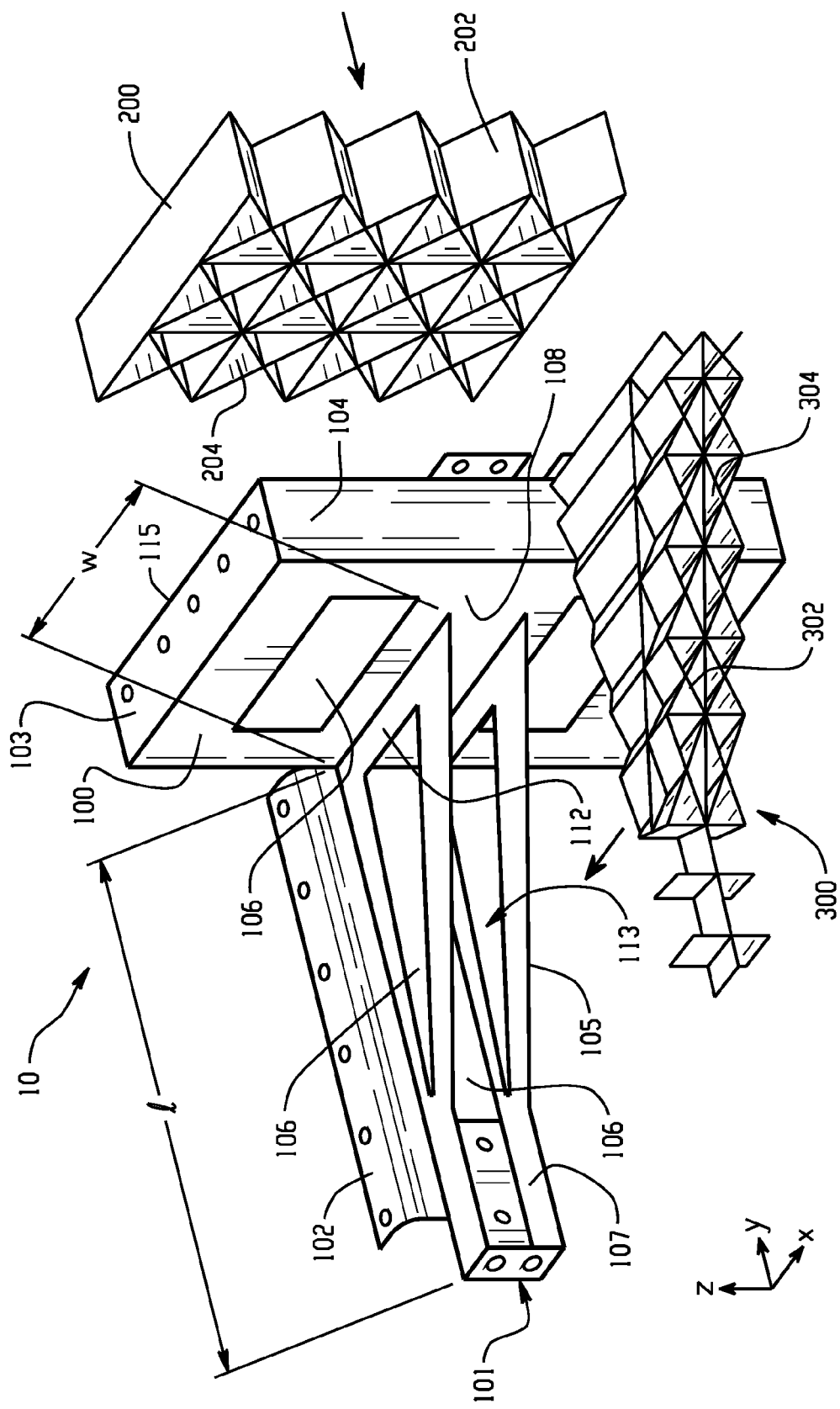
FIG. 2 is an expanded rear perspective view of an embodiment of a hybrid module, e.g., a quarter module.
Figure 3:
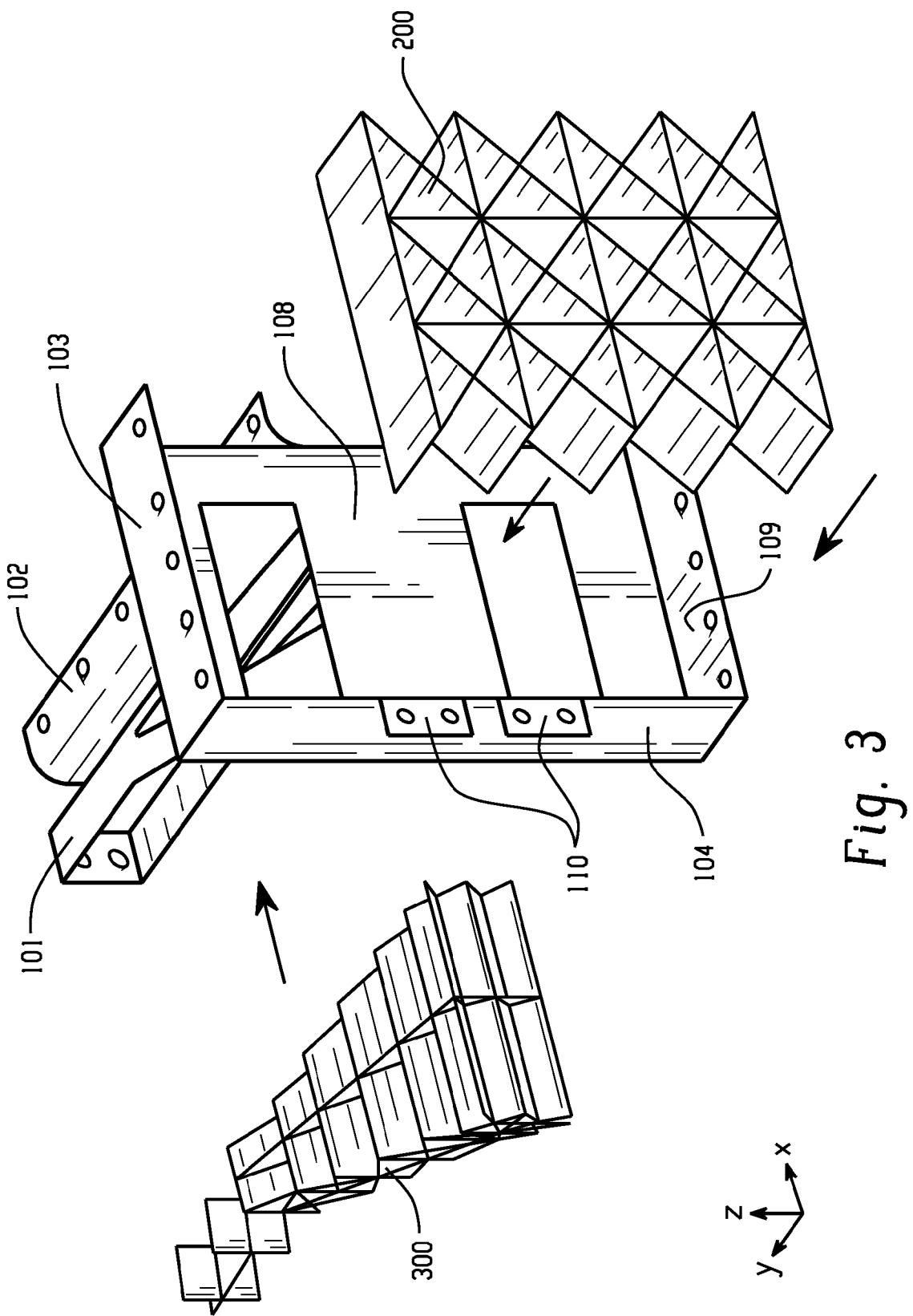
FIG. 3 is an expanded side perspective view of the hybrid module of FIG. 2.

FIG. 2 is a rear perspective view of an embodiment of the quarter module hybrid system, while FIG. 3 is a front prospective view of the quarter module hybrid system (10) of FIG. 2. These quarter modules are interchangeable. In other words, they can are capable of being located on the both the left and the right sides of a half module. These quarter modules are designed to connect with other quarter modules of the same design and not only mirror images thereof. As illustrated in FIG. 2, the housing member (10) comprises a main body (100) and an arm (101). The main body (100) comprises a base plate (108) with a top wall (103), a bottom wall (109), and side wall (104). The base plate (108), top wall (103), bottom wall (109), and side wall (104) (which optionally can be of equal depth) form a housing (115) configured to house the body polymeric insert (e.g., first insert) (200). Base plate (108) may include one or more openings (106) or cut outs that reduce the amount of material in the housing member (10), which is dependent upon a consideration of structural integrity and total weight. The body polymeric insert (200) can comprise body insert ribs (202) that form body insert channels (204).

The arm (101) extends (e.g., perpendicularly) from the body (100), e.g., from the base plate (108), in a direction away from the body polymeric insert (200). The arm (101) has a base (112) in contact with the base plate (108). The arm (101) can have a width (w) in the x direction that decreases along the arm's length (l) (in the y direction), from the base (112) toward the connection area (107). For example, the arm side (105) can have a triangular shape, e.g., a right triangle with the base (112) forming the triangle base, and the hypotenuse extending from the base to near the connection area (107). The arm sides (105) can be spaced apart forming a channel (113) to receive an arm polymeric insert (e.g., second insert) (300). The arm polymeric insert (300) can comprise arm insert ribs (302) that form arm insert channels (304). The arm insert channels (304) can optionally extend in a direction perpendicular to the body insert channels (204).

On the opposite side of the arm (101) from the channel (113) can be one or more openings (106) that enable the polymeric insert to be visible and decrease the overall weight of the housing member (10). In the alternative, the arm (101) is solid and the polymeric insert (300, 210) is not visible from the opposite side of the arm (101) from the channel (113). A determination of weight and structural integrity is necessary for the proper placement and number of openings (106) in the arm (101).

The arm (101) can include flange(s) (102) that extend across the front of arm (101), which can be cast or molded as part of arm (101) or attached through any known method, e.g. welded. Flanges (102) are dimensioned to support a front beam (152) attached to the underrun protection device. The arm (101) can optionally include an opening(s) in the front of the arm, allowing polymeric insert (300) to be visible from the front of the arm. Arm (101) includes a connection area (107) that extends beyond channel (102).

Figure 4:
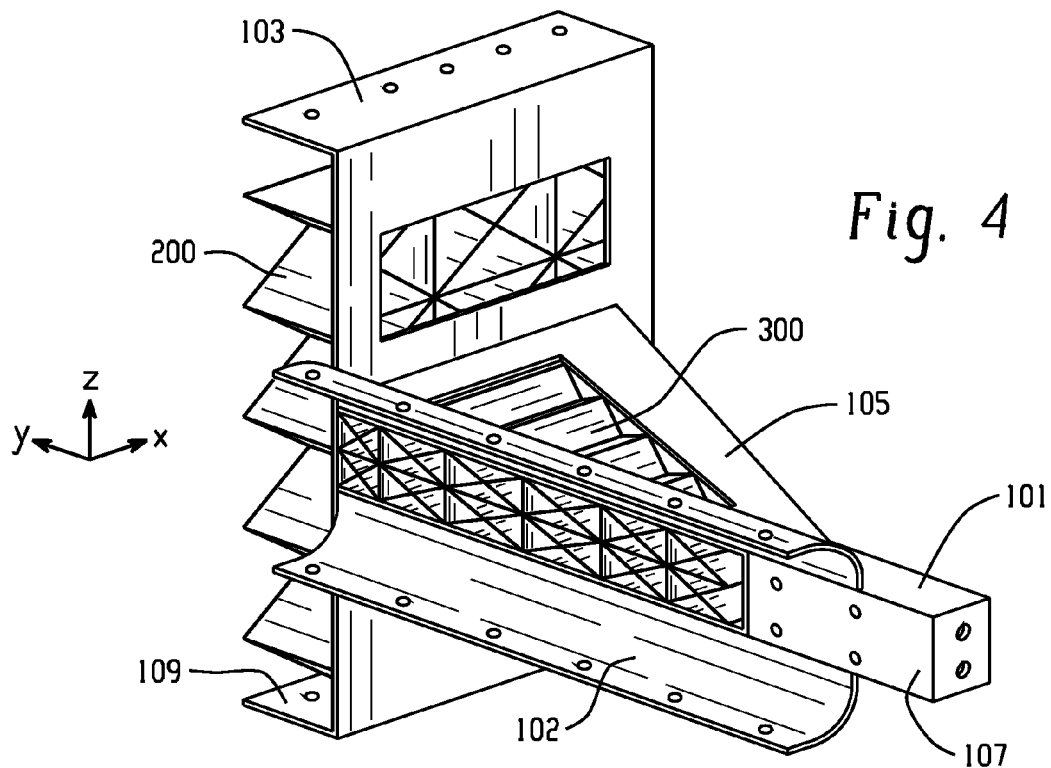
FIG. 4 is a side perspective view of the hybrid module of FIG. 2.
Figure 5:
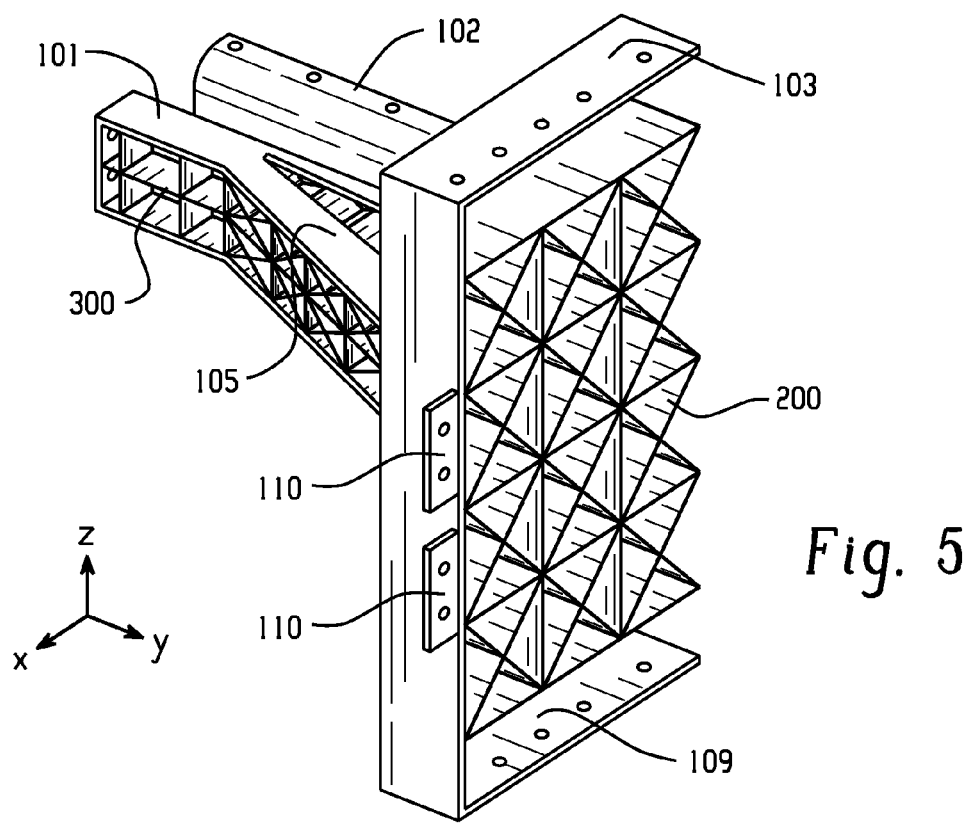
FIG. 5 is side perspective view of the hybrid module of FIG. 2.

FIG. 3 is a side view of the quarter module of FIG. 2. The side wall (104) includes two connection plates (110) with holes sized to accommodate a bolt. As illustrated in FIGS. 4 and 5, polymeric insert (300) substantially fills the area between the arm (101), sides (105), and base plate (108). In an embodiment, polymeric insert (200) has a depth that is equal to the depth of top wall (103), bottom wall (109), and side wall (104) so as to substantially fill the volume created by the walls and the base plate. In one embodiment, polymeric insert (200) has a length that is less than the length of side wall (104) so as to create a gap between polymeric insert (200) and both top wall (103) and bottom wall (109). The gap creates space for the polymeric insert (200) to crush and absorb energy from impact while minimizing reaction forces on the body (100).

In an embodiment, the quarter modules are symmetrical. In other words, the top and bottom of the quarter modules are designed so that the half modules use two quarter modules that are a mirror image along a line passing laterally through the center of the half module. The symmetrical nature allows for a single design to be employed for both a right and left piece forming the half module. As discussed in greater detail below, using a single design for the quarter module provides the benefit of reducing tool and manufacturing costs.

Figure 6:
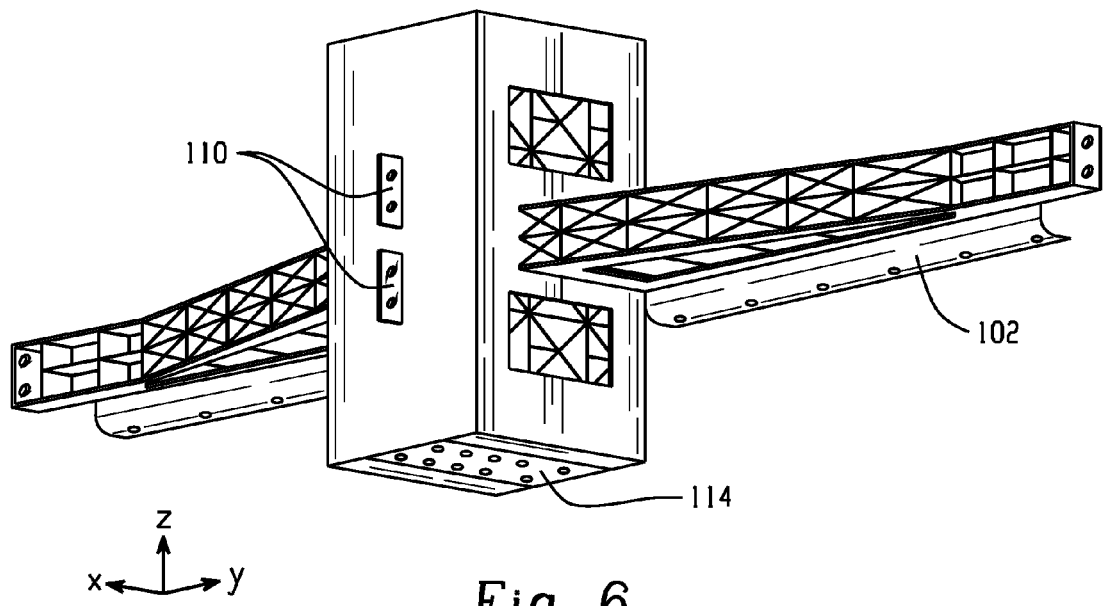
FIG. 6 is a rear view of two hybrid modules of FIG. 2 forming one single half module.
Figure 7:
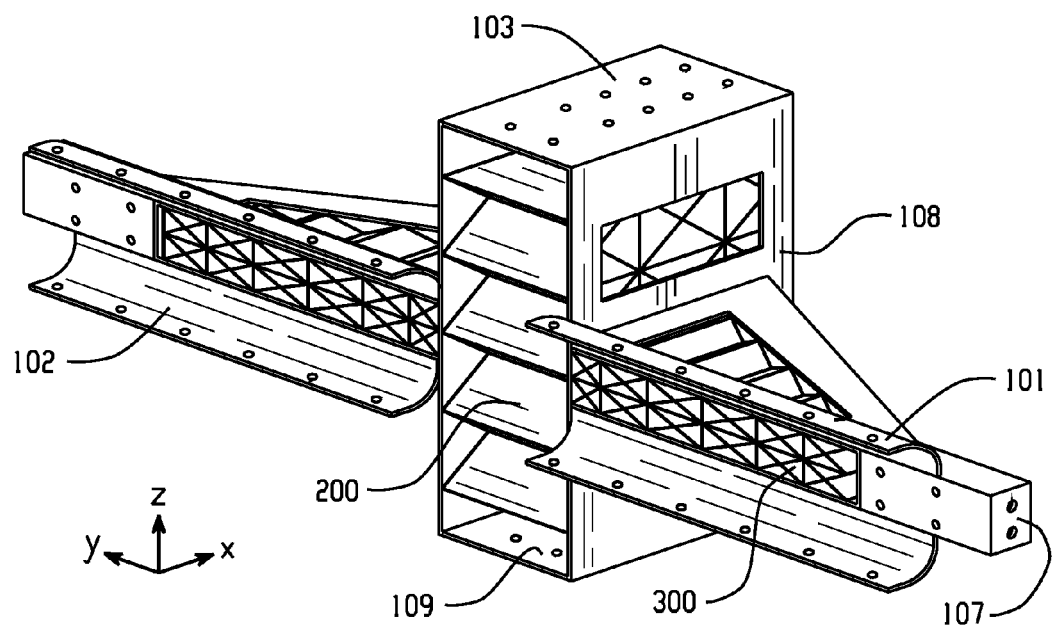
FIG. 7 is a front view of two hybrid modules of FIG. 2 forming one single half module.

FIG. 6 is a rear view illustrating two quarter modules joined together into a half module. As shown in FIG. 6, the quarter module can be joined to another quarter module by lining up connection plates (110). In order to secure the connection plates (110), a bolt can be engaged through the holes in the connection plates (110). The two quarter modules can also be joined together by any means, such as welding. As shown in FIG. 7, the base plate and walls of the quarter module form a box structure when joined to another quarter module with the front of the box open allowing access to the polymeric insert (200). In an embodiment, an additional wall can be employed to close the box structure formed by the walls and base plate.

Figure 8:
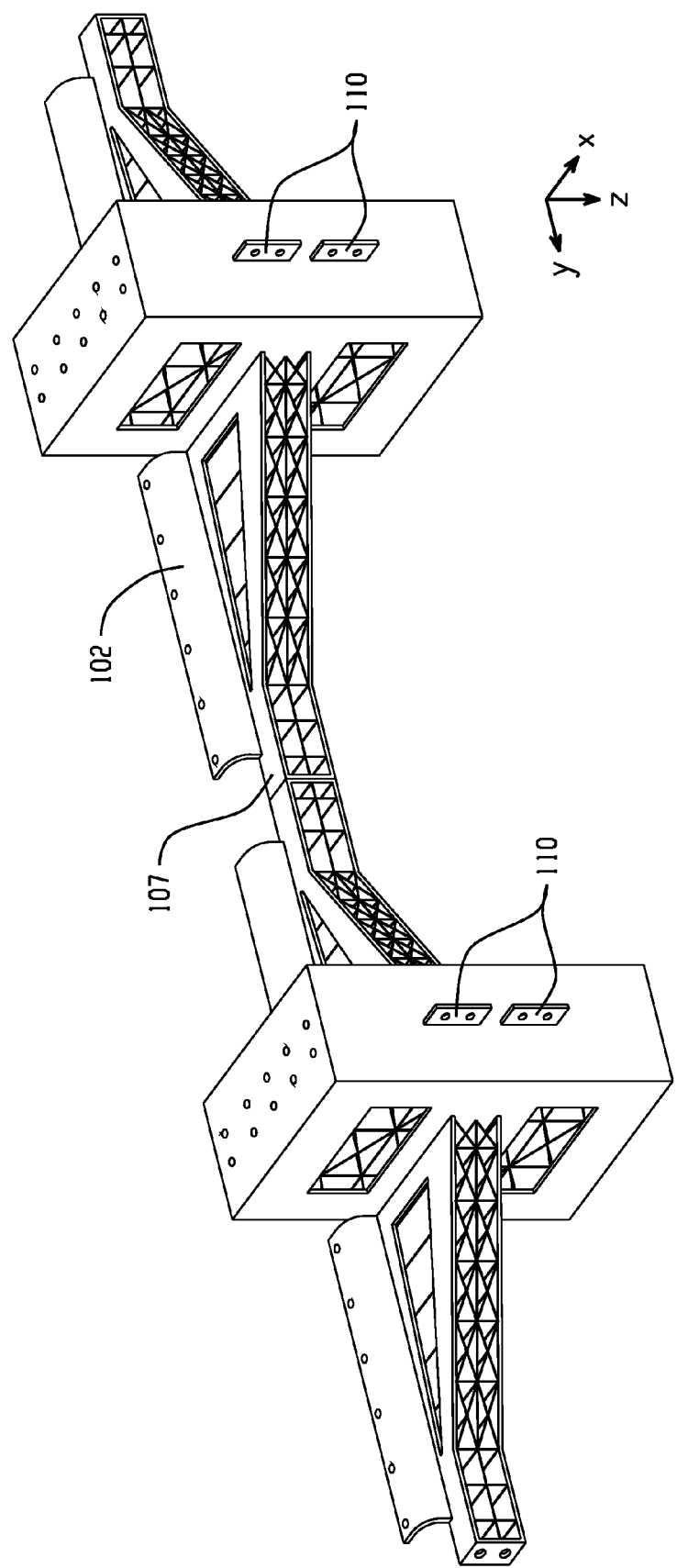
FIG. 8 is a rear view of four hybrid modules of FIG. 2 assembled to form a full front underrun protection device.
Figure 9:
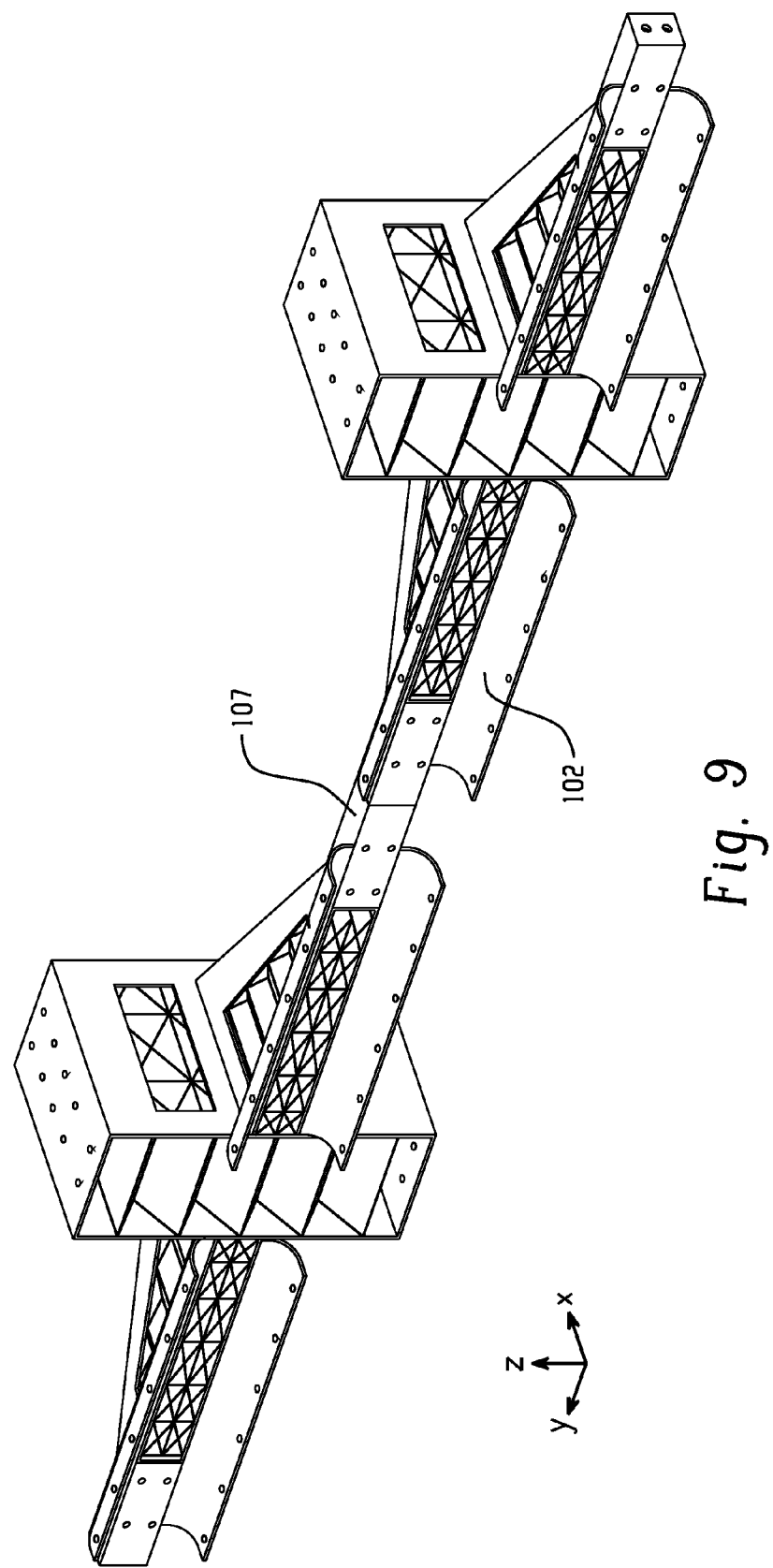
FIG. 9 is a front view of four hybrid modules of FIG. 2 assembled to form a full front underrun protection device.

FIGS. 8 and 9 illustrate a fully assembled underrun protection device. As shown in FIG. 8, the two quarter modules assembled into a half module are joined to another half module at connection area (107). The connection area can comprise any connection used in vehicle design. For example, connection area can comprise one or more holes to accommodate corresponding bolt connections. In addition, flanges (102) extend laterally across the assembled underrun protection device. The flanges (102) can support a beam that is complimentary to the shape of the flanges and that extends at least the length of the assembled underrun protection device.

Figure 10:
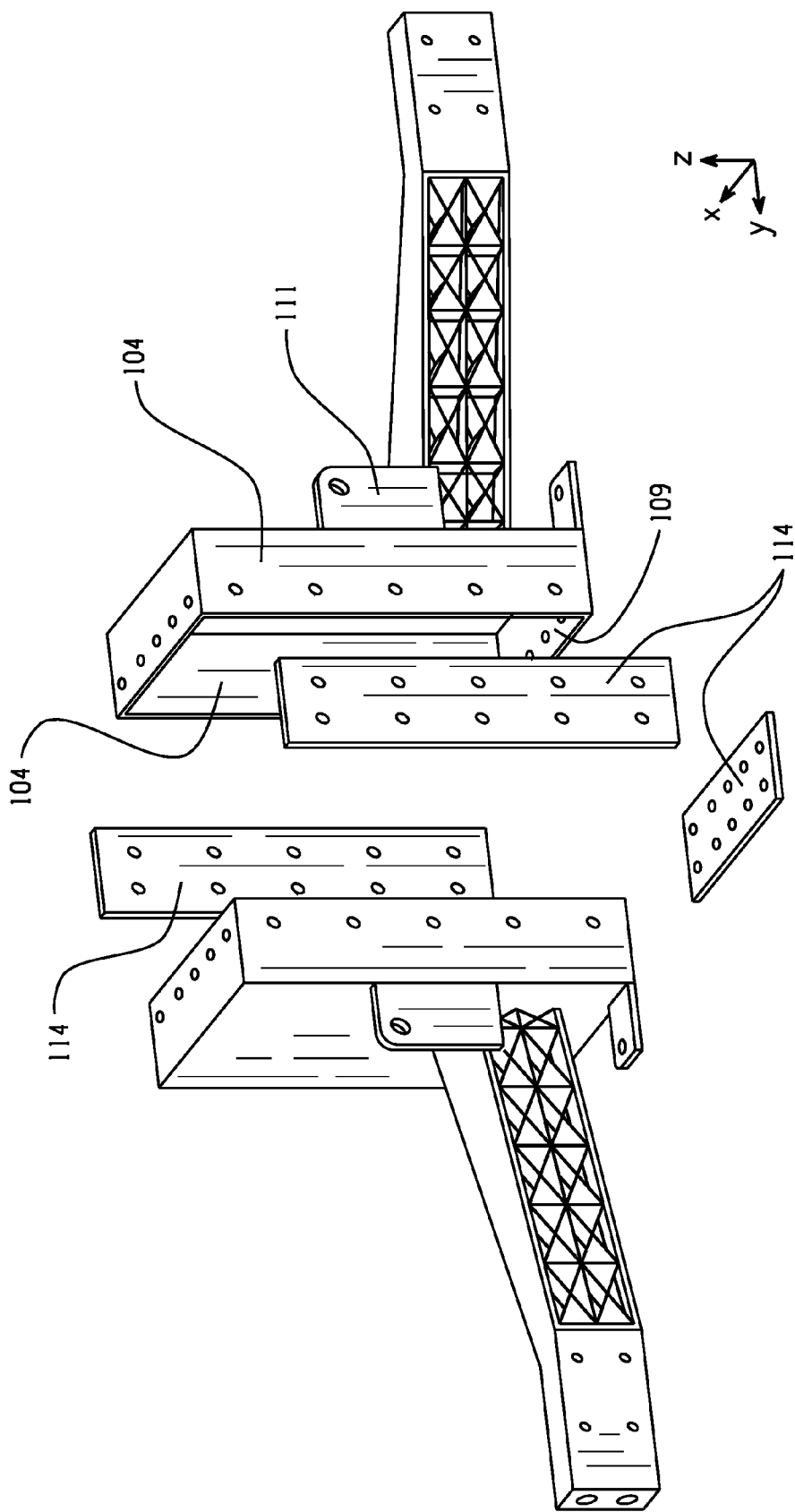
FIG. 10 is expanded front perspective view of an embodiment of two hybrid modules that can form another embodiment of a half module.

FIG. 10 illustrates another embodiment comprising connection plates 114 that can join two quarter modules. As is illustrated, these quarter modules are not interchangeable. Each one can only function as either the left or the right side of a half module, but not both. In other words, they are configured to connect with each other, but cannot connect to another of the same quarter modules. For example, connection plate (114) can be used to join bottom wall (109) of a first quarter module to a corresponding bottom wall (109) of a second quarter module. Connection plate (114) can comprise holes that, when connection plate (114) is placed inside or outside of bottom wall (109), line up with holes in bottom wall (109) and can accommodate one or more bolts to join connection plate (114) and bottom wall (103). These optional connection plates (114) can provide further structural integrity to the main body (100). In the same manner, holes on the opposite side of connection plate can be aligned with holes on a bottom wall of a second quarter module, joined together with a bolt, which joins the two quarter modules through the connection plate. Top wall (103) and side walls (104) can also have holes and be joined to a corresponding wall on a second quarter module through the use of a connection plate and one or more bolts as described above for the bottom wall (109). The connection plate (114) can also be welded to any of the walls (103, 104, 109) and subsequently joined to a corresponding wall on a second quarter module through welding of the connection plate to the corresponding wall.

Figure 11:
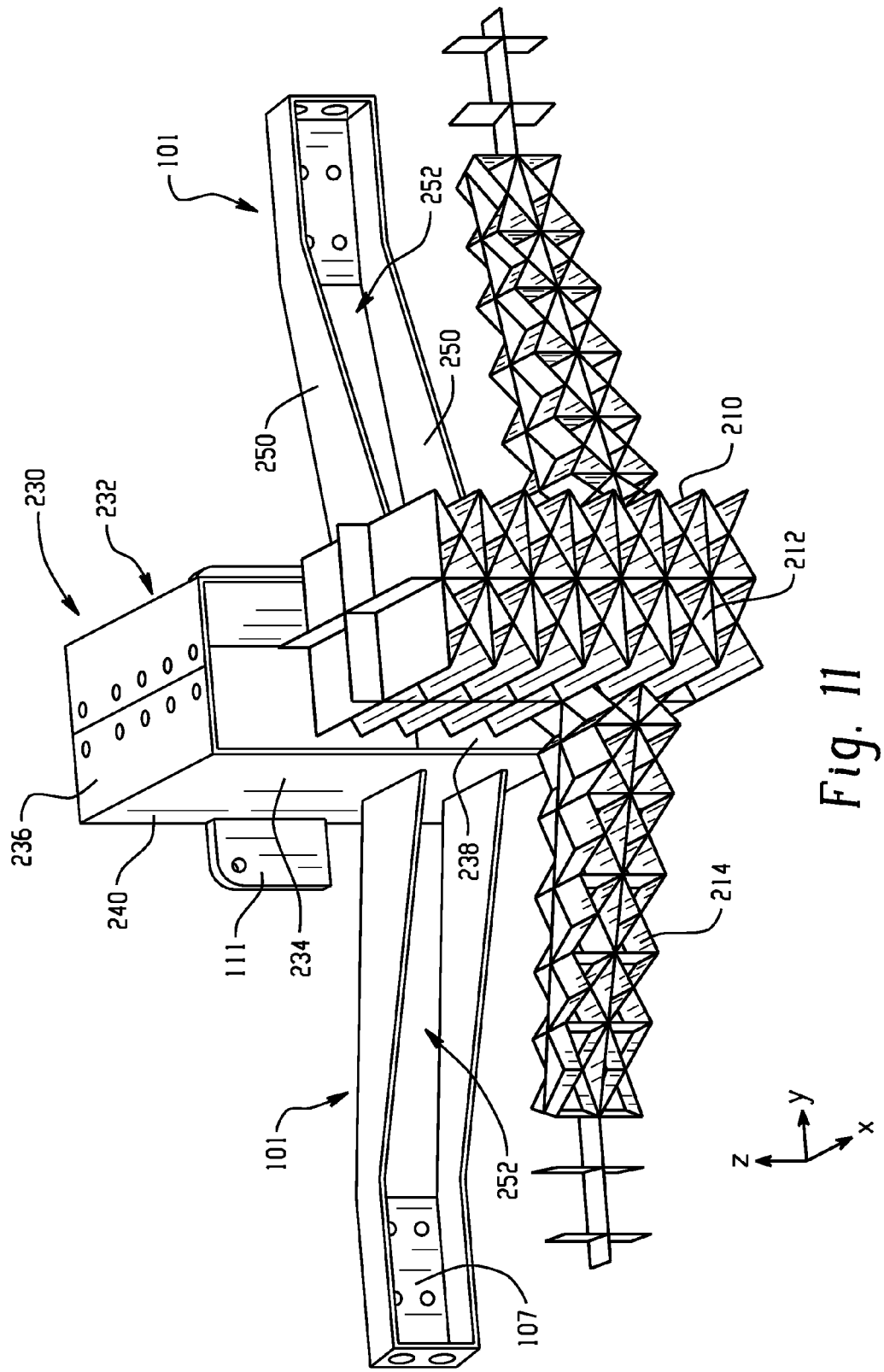
FIG. 11 is expanded front perspective view of another embodiment of a hybrid half module.

FIG. 11 illustrates a half module formed from a unitary housing member (230). In other words, a half module is a single housing member (230) having arms (101) extending from opposite sides of the main body (232). The base plates (234), top wall (236), and bottom wall (238) form a body housing (240). Additionally, the arm sides (250) form an arm channel (252). As with the housing member (230), the combined polymeric insert (210) can be a unitary body configured to be located in the body housing (240) and the arm channel (252). In the alternative, combined polymeric insert (210) may comprise multiple sections that are inserted into unitary housing member (230). As is illustrated, the channels (212) of the portion of the combined polymeric insert (210) that will be located in the main body (232) can be parallel (e.g., can be coaxial) with the channels (214) of the portion of the combined polymeric insert (210) that will be located in the arm channel (252).

Optionally, a full underrun protection device can be formed from a unitary housing member body (260) that extends the entire length of the protection device. For example, the underrun protection device shown in FIG. 12 can be formed from a single housing member.

Figure 12:
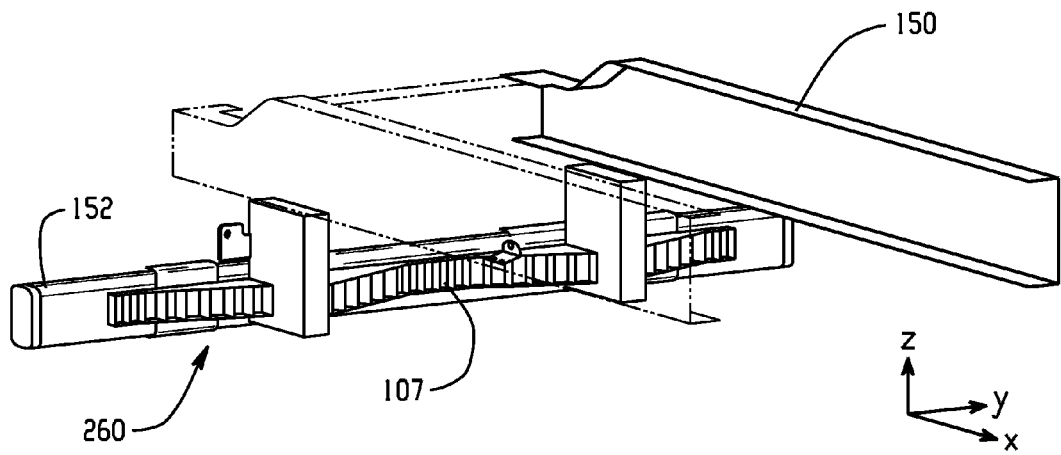
FIG. 12 is a partial rear perspective view of an underrun protection device attached to a vehicle rail, illustrating two assembled half modules.
Figure 13:
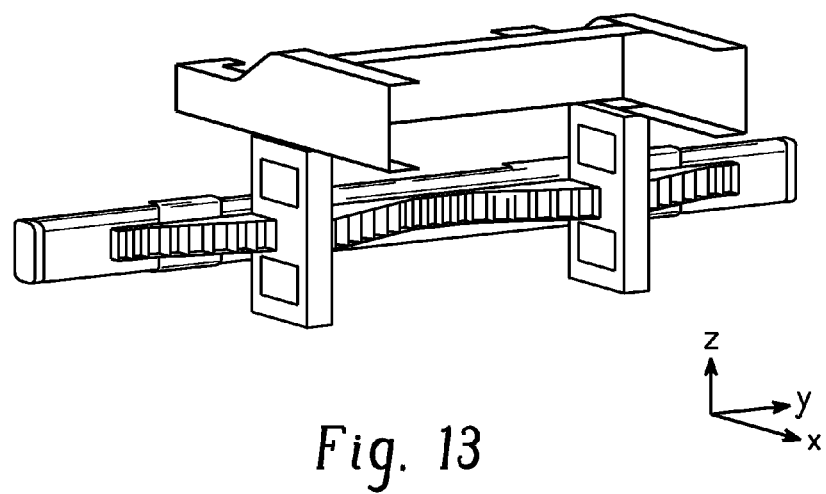
FIG. 13 is a partial rear perspective view of an underrun protection device attached to a vehicle rail, illustrating four assembled quarter modules.
Figure 14:
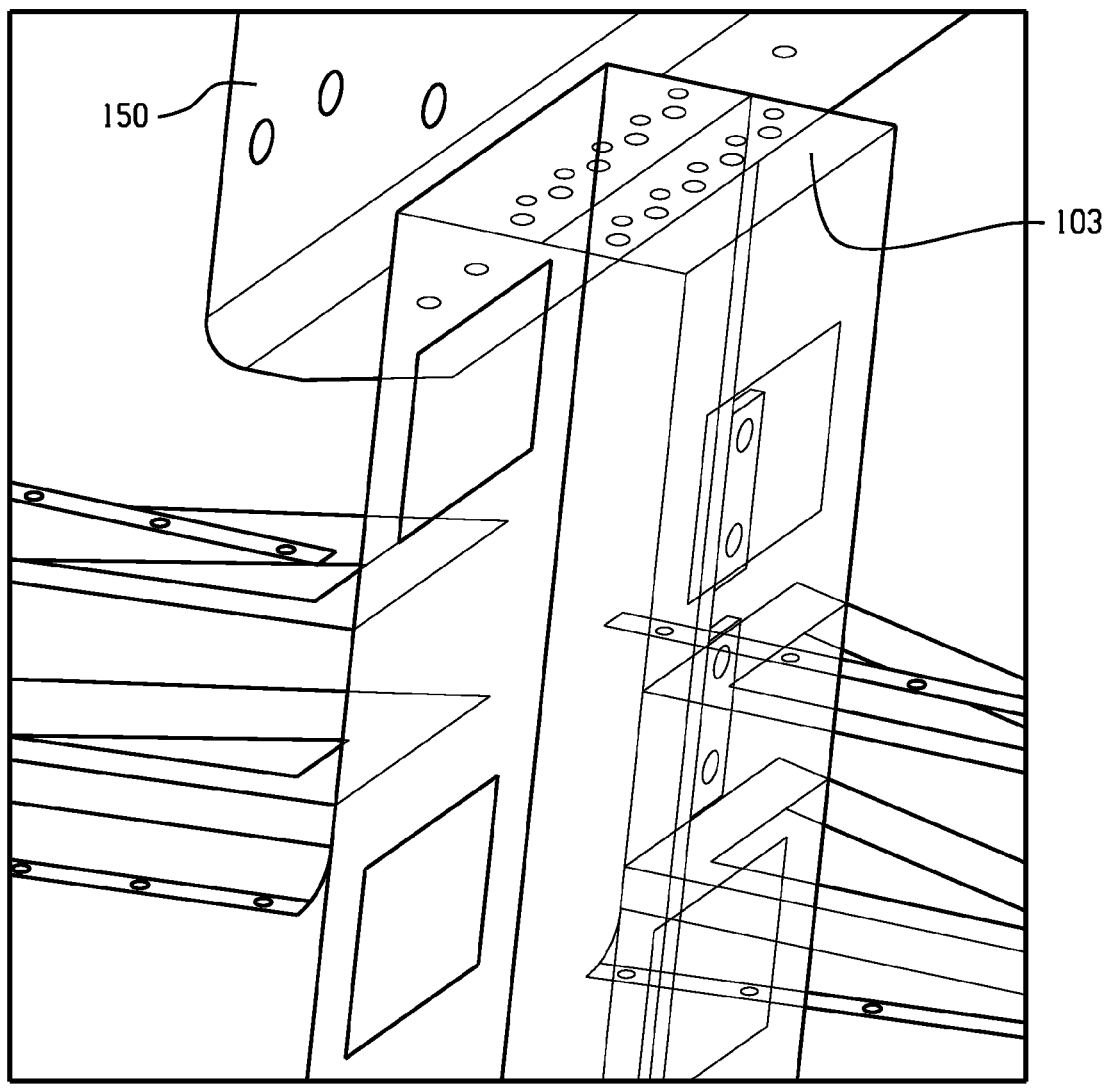
FIG. 14 is a partial side perspective view of an attachment of an underrun protection device to a vehicle rail.

The underrun protection device can be mounted to a vehicle in various manners. For example, bolts, screws, pins, and welds can be employed to mount the front underrun protection device. As shown in FIG. 12 and FIG. 14, the underrun protection device can be mounted to a vehicle rail (150). The vehicle rail (150) can comprise holes that correspond to holes in the top wall (103) of a underrun protection device. A bolt may be used to secure the underrun protection device to the vehicle rail (150). In the alternative, or in combination with a bolt, the underrun protection device can be mounted to a vehicle through welding.

Figure 15:
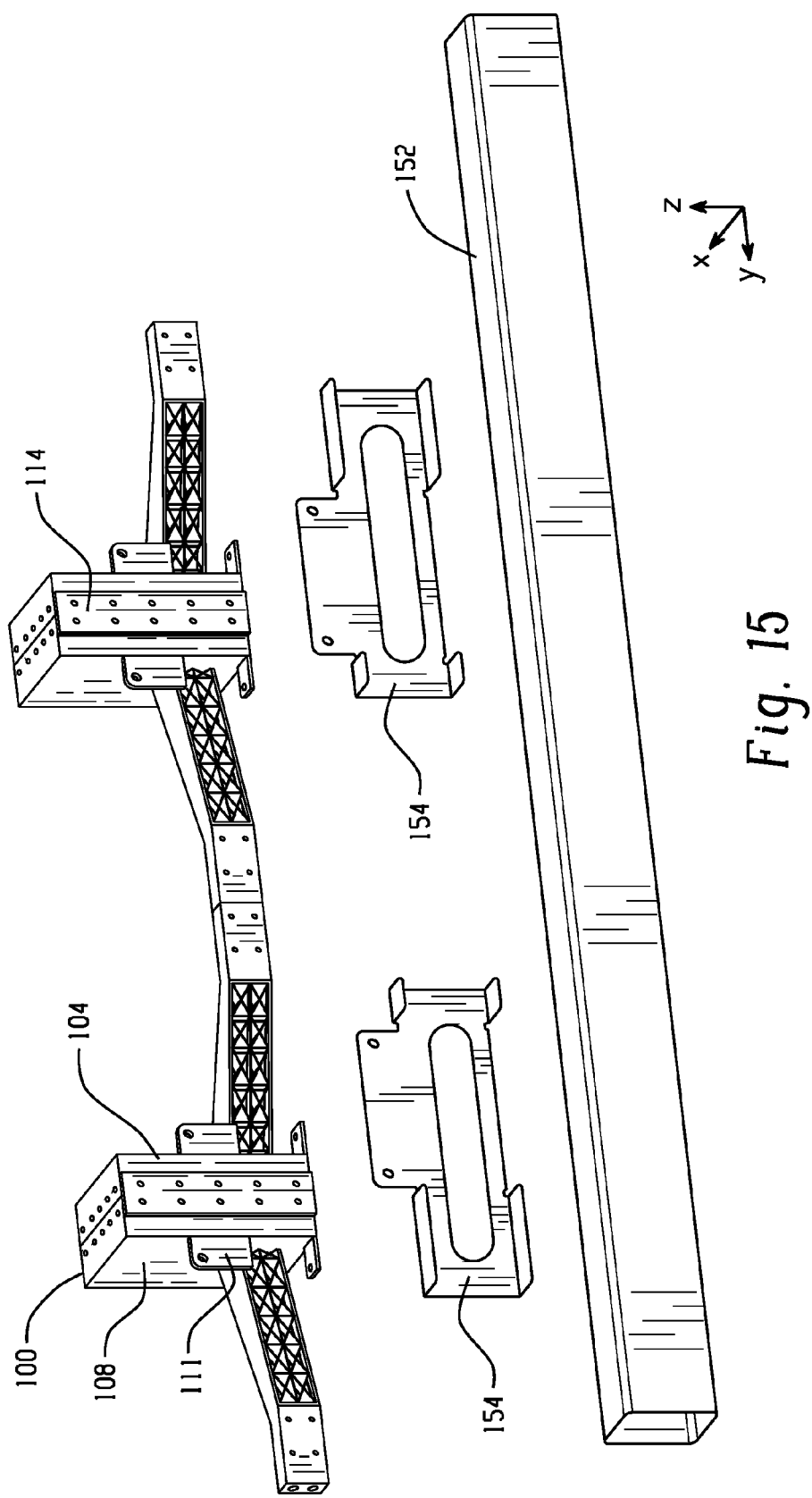
FIG. 15 is an expanded front view of an embodiment of an underrun protection device illustrating assembled half modules.

FIG. 15 illustrates an embodiment comprising connector(s) (111) extending from the base plate (108) in the opposite direction and coplanar with the side wall (104). The connector (111) can optionally accommodate an optional bumper beam support (154), which is configured to house a bumper beam (152), and/or can comprise the flange (102) (See FIG. 7). Connector(s) (111) can comprise holes that correspond to holes in the bumper beam support (154) of an underrun protection device. The bumper beam support (154) can be used as an alternative to or in addition to flange (102). A mechanical attachment (e.g., bolt, welding, or the like) may be used to secure the bumper beam support to the connectors (111).

The underrun protection device formed from at least four quarter modules comprises at least 50% of the width of the vehicle. The underrun protection device comprises at least 75% of the width of vehicle. In an embodiment, a front underrun protection device comprises at least 90% of the width of the vehicle. For example, four quarter modules may be joined together to form the underrun protection device. The actual size of the device is dependent upon the specific vehicle and its location on the vehicle (front, rear, or side(s))

As discussed above, the polymeric inserts can comprise various materials. In addition, the polymeric inserts can have various geometries. For example, the polymeric inserts can comprise a plurality of channels and sets of ribs disposed within each channel. The channels extend longitudinally and comprise an upper traverse wall and a lower traverse wall. Within each channel, a plurality of ribs can extend from the upper traverse wall to the lower traverse wall. In specific embodiments, the lower traverse wall of the first channel can be the same as the upper traverse wall of the second channel. In an embodiment, a back wall extends between the lower traverse wall of each channel and the upper traverse wall of each channel.

The ribs of the first and second sets of channels can be substantially parallel. Advantageously, the upper and lower traverse walls of the channels as well as the ribs are configured in such a way that the ribs have a generally C-shaped cross section. It has been discovered that the dual layer C-section shaped lobes allow for controlled and efficient energy absorption. In an embodiment, the ribs can have a crossing pattern, e.g., X-shaped. In another embodiment, the ribs are substantially vertical.

Optionally, the polymer member comprises stiffening members disposed on the upper traverse wall of each channel and/or the lower traverse wall of each channel. For example, a plurality of stiffening members can be positioned on an exterior surface of the upper traverse wall of a first channel and/or an exterior surface of the lower traverse wall of a second channel.

By varying at least the spacing of the upper and lower traverse walls of the channels, the spacing of the ribs, the thickness of the walls and ribs, the polymer member can be tuned to have different stiffness and impact characteristics. For example, the spacing between the upper and lower traverse walls of a channel can be up to 200 mm or so, e.g., 10 mm to 200 mm, or 20 mm to 80 mm, or from 40 mm to 60 mm. The spacing between ribs can be up to 200 mm or so, e.g., 10 mm to 200 mm, or 20 mm to 80 mm, or 40 mm to 60 mm. The thickness of the traverse walls can be 1 mm to 10 mm, for example, 2 mm to 8 mm, or 3 mm to 5 mm. The thickness of the ribs can be 1 mm to 10 mm, for example, 2 mm to 8 mm, or 3 mm to 5 mm. The areas created by the upper and lower transverse walls and ribs can be optionally be filled with foam.

Figure 16C:
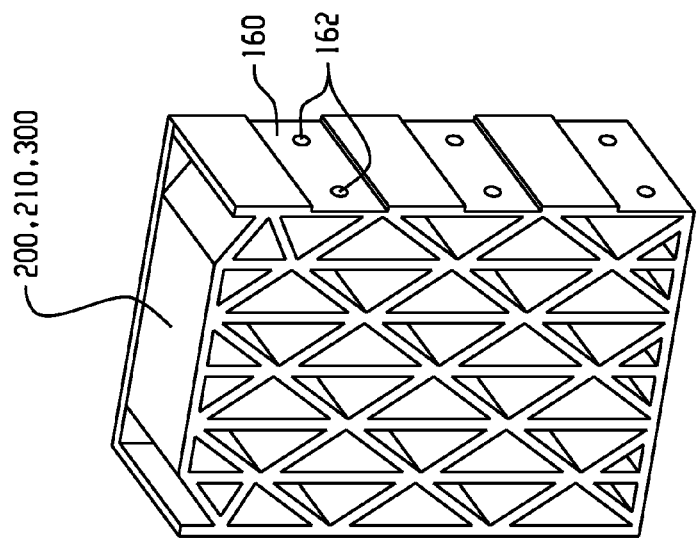
FIGS. 16a-16c are exemplary illustrations of polymeric insert geometries.
Figure 16B:
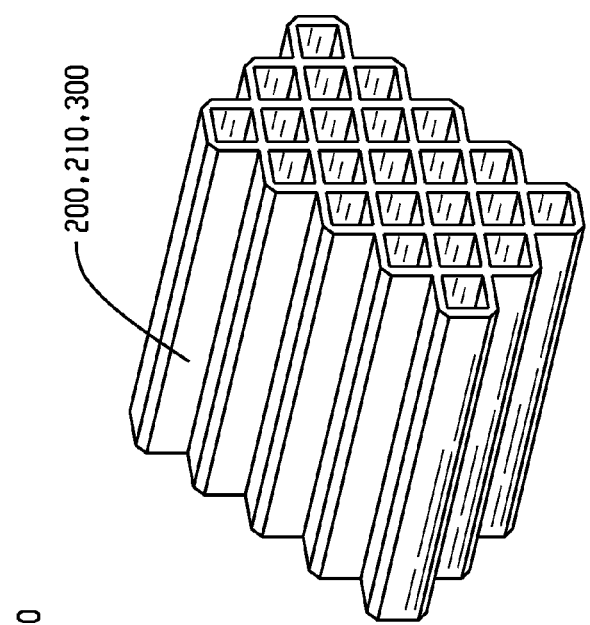
Figure 16A:
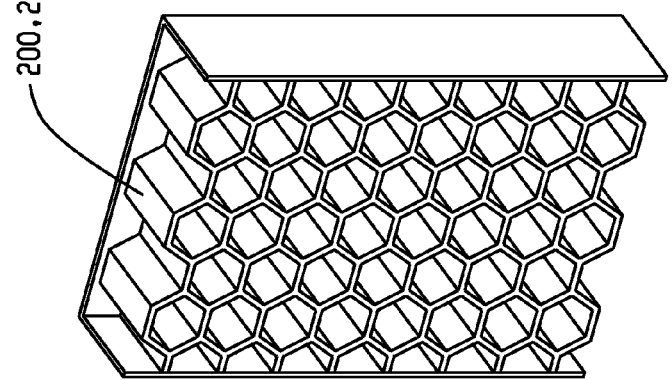

FIGS. 16a-c illustrate exemplary designs of the polymeric inserts (200, 210, (300)), including some exemplary shapes for the combs thereof. Some exemplary designs for the polymeric insert include a layered structure comprising a plurality of layers of triangular structures (e.g., layers with diagonal ribs forming triangles; e.g., FIG. 16a), rounded comb structures (e.g., circular, oval, and so forth), polygonal comb structures (e.g., a hexagonal comb structure (e.g., FIG. 16b), four sided comb structure (e.g., FIG. 16c), pentagonal, and so forth), as well as combinations comprising at least one of the foregoing. As can be seen in FIG. 16c, the housing member can comprise a groove (160) and openings (162) such that the polymer insert can extend through the opening(s) (162) into the groove (160), thereby securing the insert within the housing member.

The quarter modules provide an advantage in that only a single quarter module design has to be manufactured. Thus, the quarter modules eliminate the need for tooling and equipment to manufacture multiple components with different geometries, e.g., a left component and a right component. For example, because of the symmetrical nature of the quarter module, the quarter module can be flipped and joined to another quarter module to form a half of a front underrun protection device or half module. Accordingly, significant costs are eliminated by the featured design. Furthermore, the quarter modules are easily shipped and can be assembled quickly.

These quarter modules have enabled significant savings in weight, processing times, and assembly times. For example, when comparing (for the same vehicle) the present quarter modules and using a standard steel front underrun protection device, and requiring both systems to meet ECE-R93, the quarter modules enable a reduction in weight of greater than 20% of the weight of the bumper system, specifically greater than or equal to 25% weight reduction, and more specifically, greater than or equal to 30% weight reduction. In addition, the quarter modules offer a similar performance compared to an all steel design.

According to one embodiment, a front underrun protection device comprising the quarter modules described above is capable of deforming less than 400 mm when subjected to a 60,000 N load at a corner in compliance with ECE-R93. In one embodiment, the device is capable of deforming less than (300) mm when subjected to a 60,000 N load at a corner in compliance with ECE-R93. In one embodiment, the device is capable of deforming less than 400 mm when subjected to a 120,000 N load at the center in compliance with ECE-R93. In another embodiment, the device is capable of deforming less than 375 mm when subjected to a 120,000 N load at the center in compliance with ECE-R93.

EXAMPLES

Simulation studies were conducted to quantify the effectiveness of the front underrun protection device in absorbing energy at moderate impacts.

A hybrid beam as shown in FIGS. 8 and 9 with was mounted with a steel beam on a generic vehicle chassis, e.g., to the body in white (BIW). The front underrun protection device comprised approximately 5 kg of STAMAX™ polymer material and approximately 8 kg of FE410 steel. The steel beam comprised 30 Y FE410 at approximately 3 mm thick and had a mass of approximately 16 kg. The resulting vehicle is evaluated for ECE R93 standards. Corner and middle impact with a load of 6,000 N results in a deformation of 290 mm. Support location impact with a load of 120,000 N results in a deformation of 375 mm.

It is observed that the front underrun protection device passes all of the ECE R93 impact tests by maintaining the allowable deformation levels.

It is noted that the sizes and shapes of the various elements of the quarter modules disclosed herein can be discussed in relation to particular figures merely for convenience and clarity (e.g., to identify which dimension is being discussed). However, the sizes are intended to apply to all possible embodiments of the various elements and not merely the specific figures with which they are discussed.

Set forth below are some examples of embodiments of the underrun protection device, components thereof, and vehicles using the same.

Embodiment 1: A component for an under run protection device comprises: a base plate, wherein the base plate has a front, a back, a top, a bottom, a first side, and a second side; a top wall extending from the front of the base plate and across the length of the top of the base plate; a bottom wall extending across the length of the bottom of the base plate; at least one side wall extending across the length of the first side of the base plate between the top and bottom walls, wherein the top wall, bottom wall, and side wall form a housing; an arm extending from the back of the base plate, wherein the arm comprises a front, a back, a top, and a bottom, and wherein a channel extends across a portion of the arm; a first polymeric insert comprising ribs and channels, wherein the first polymeric insert is located in the housing; and a second insert shaped to substantially fill the channel in the arm.

Embodiment 2: A component for an underrun protection device comprising: a housing member (10), comprising a main body (100) having a base plate (108) with a top wall (103), bottom wall (109), and optional side walls (104), extending from one side of the base plate (108) to form a housing (115); an arm (101) extending from another side of the base plate (108), wherein the arm (101) comprises a base (109) in contact with the base plate (108), arm sides (105) that extend from the base (109) toward a connection area (107), wherein the arm sides (105) form an arm channel (113); a body polymeric insert (200) comprising body insert ribs (202) and body insert channels (204), wherein the body polymeric insert (200) is located in the housing (115); and an arm polymeric insert (300) comprising arm insert ribs (302) and arm insert channels (304), wherein the arm polymeric insert (300) is located in the arm channel (113).

Embodiment 3: The component of any of Embodiments 1-2, wherein the housing member comprises an opening (106) through at least one of the base plate (108), the top wall (103), the bottom wall (109), the side wall (104), the arm channel (113), the arm sides (105), and the connection area (107).

Embodiment 4: The component of any of Embodiments 1-3, wherein the arm sides (105) have a triangular shape with the base (109) being the base of the triangle.

Embodiment 5: The component of Embodiment 4, wherein the triangle is a right triangle.

Embodiment 6: The component of any of Embodiments 1-5, wherein the body polymeric insert and the arm polymeric insert comprise a fiber reinforced polymeric material.

Embodiment 7: The component of any of Embodiments 1-6, wherein the main body further comprises connection members to connect a component to another component.

Embodiment 8: The component of any of Embodiments 1-7, further comprising a flange configured to receive a bumper beam (152).

Embodiment 9: The component of any of Embodiments 1-8, wherein the arm insert channels (304) extend in a direction perpendicular to the body insert channels (204).

Embodiment 10: The component of any of Embodiments 1-8, wherein the arm insert channels (304) extend in a direction parallel to the body insert channels (204).

Embodiment 11: The component of Embodiment 10, wherein arm polymeric insert and the body polymeric insert are a combined, unitary polymeric insert (210).

Embodiment 12: The component of any of Embodiments 1-9, wherein the arm channels extends from the second side of the base plate, away from the first side.

Embodiment 13: The component of any of Embodiments 1-12, wherein the housing member comprises a different material than the polymeric insert.

Embodiment 14: The component of any of Embodiments 1-13, wherein the housing member comprises a polymer.

Embodiment 15: The component of any of Embodiments 1-14, wherein the component is free of metal.

Embodiment 16: The component of any of Embodiments 1-16, wherein the housing member comprises fiber reinforcement.

Embodiment 17: The component of any of Embodiments 1-14, wherein the housing member comprises metal.

Embodiment 18: An underrun protection device comprising the component of any of Embodiments 1-17.

Embodiment 19: The device of Embodiment 18, comprising at least two of the components.

Embodiment 20: The device of Embodiment 18, comprising at least four identical of the components joined together.

Embodiment 21: The device of any of Embodiments 18-20, wherein, when installed on a vehicle, the device at least meets ECE R93 standards.

Embodiment 22: A vehicle, comprising: a rail; the device of any of Embodiments 18-21 attached to the rail; and a bumper beam attached to the device.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. "Or" means and/or unless clearly specified otherwise. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A component for an underrun protection device comprising:
    a housing member, comprising
        a main body having a base plate with a top wall, bottom wall, and optional side walls, extending from one side of the base plate to form a housing;

an arm extending from another side of the base plate, wherein the arm comprises a base in contact with the base plate, arm sides that extend from the base toward a connection area, wherein the arm sides form an arm channel;

a body polymeric insert comprising body insert ribs and body insert channels, wherein the body polymeric insert is located in the housing; and an arm polymeric insert comprising arm insert ribs and arm insert channels, wherein the arm polymeric insert is located in the arm channel.

2. The component of claim 1, wherein the housing member comprises an opening through at least one of the base plate, the top wall, the bottom wall, the side wall, the arm channel, the arm sides, and the connection area.

3. The component of claim 1, wherein the arm sides have a triangular shape with the base being the base of the triangle.

4. The component of claim 3, wherein the triangle is a right triangle.

5. The component of claim 1, wherein the body polymeric insert and the arm polymeric insert comprise a fiber reinforced polymeric material.

6. The component of claim 1, wherein the main body further comprises connection members to connect the component to another component.

7. The component of claim 1, further comprising a flange configured to receive a bumper beam.

8. The component of claim 1, wherein the arm insert channels extend in a direction perpendicular to the body insert channels.

9. The component of claim 1, wherein the arm insert channels extend in a direction parallel to the body insert channels.

10. The component of claim 9, wherein the arm polymeric insert and the body polymeric insert are a combined, unitary polymeric insert.

11. An underrun protection device comprising the component of claim 1.

12. The device of claim 11, comprising at least two of the components.

13. The device of claim 11, comprising at least four identical of the components joined together.

14. The device of claim 11, wherein, when installed on a vehicle, the device at least meets ECE R93 standards.

15. A vehicle, comprising:
a rail;
the device of claim 11 attached to the rail; and
a bumper beam attached to the device.

16. The component of claim 1, wherein the housing member comprises an opening through at least one of the base plate, the top wall, the bottom wall, the side wall, the arm channel, the arm sides, and the connection area; wherein the arm sides have a triangular shape with the base being the base of the triangle; wherein the body polymeric insert and the arm polymeric insert comprise a fiber reinforced polymeric material.

17. The component of claim 16, further comprising a flange configured to receive a bumper beam.

18. The component of claim 1, wherein the arm insert channels extend in a direction perpendicular to the body insert channels.

19. The component of claim 16, wherein the arm polymeric insert and the body polymeric insert are a combined, unitary polymeric insert.

* * * * *